United States Patent
Amedro et al.

(10) Patent No.: US 11,130,860 B2
(45) Date of Patent: Sep. 28, 2021

(54) THERMOPLASTIC COMPOSITE

(71) Applicant: ROQUETTE FRERES, Lestrem (FR)

(72) Inventors: Hélène Amedro, Bethune (FR);
Jean-Marc Corpart, Lambersart (FR);
Nicolas Jacquel, Lambersart (FR);
René Saint-Loup, Lomme (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 16/608,986

(22) PCT Filed: May 7, 2018

(86) PCT No.: PCT/EP2018/061723
§ 371 (c)(1),
(2) Date: Oct. 28, 2019

(87) PCT Pub. No.: WO2018/202917
PCT Pub. Date: Nov. 8, 2018

(65) Prior Publication Data
US 2020/0190317 A1    Jun. 18, 2020

(30) Foreign Application Priority Data
May 5, 2017   (FR) ..................... 17 54004

(51) Int. Cl.
*C08L 67/02* (2006.01)
*C08J 5/04* (2006.01)
*C08J 5/24* (2006.01)

(52) U.S. Cl.
CPC .............. *C08L 67/02* (2013.01); *C08J 5/046* (2013.01); *C08J 5/24* (2013.01); *C08J 2367/02* (2013.01)

(58) Field of Classification Search
CPC .... C08L 67/02; C08G 63/672; C08J 2367/02; C08J 5/046; C08J 5/24
See application file for complete search history.

(56) References Cited

U.S. PATENT DOCUMENTS 5,286,557 A * 2/1994 Jacob .................. C08J 5/04
                                                      442/392
2011/0282020 A1   11/2011 Sipos
2017/0335055 A1   11/2017 Jacquel et al.
2018/0155493 A1   6/2018 Jacquel et al.

FOREIGN PATENT DOCUMENTS

| CN | 102719059 | * | 10/2012 |
| CN | 102719059 | A | 10/2012 |
| EP | 1882712 | A1 | 1/2008 |
| WO | 2013062408 | A1 | 5/2013 |

OTHER PUBLICATIONS

F. Fenouillot et al "Polymers from renewable 1,4:3,6-dianhydrohexitols (isosorbide, isomannide and isoidide): A review", Progress in Polymer Science 35 (2010) 578-622. (Year: 2009).*
J. M. Koo et al "Structural and thermal properties of poly(1,4-cyclohexane dimethylene terephthalate) containing isosorbide", Polym. Chem., 2015, 6, 6973. (Year: 2015).*
S. R. Turner et al "Amorphous and Crystalline Polyesters based on 1,4-Cyclohexanedimethanol", Chapter 7 of Modern Polyesters: Chemistry and Technology of Polyesters and Copolyesters. Edited by J. Scheirs and T. E. Long, 2003. (Year: 2003).*
The English translation of the International Search Report, dated Jul. 16, 2018, in the corresponding PCT Appl. No. PCT/EP2018/061723.
Database WPI Week 201377 Thomson Scientific, London, GB; An 2013-M96759 XP002777247, & CN 102 719 059 A (Shanghai Sunny New Technology Dev Co Ltd) Oct. 10, 2012 (Oct. 10, 2012) abstract.

* cited by examiner

*Primary Examiner* — Ling Siu Choi
*Assistant Examiner* — Gennadiy Mesh

(57) ABSTRACT

A thermoplastic composite comprising a thermoplastic polymer matrix comprising an amorphous polyester containing 1,4: 3,6-dianhydrohexitol units, an alicyclic diol and terephthalic acid, wherein diol component comprises 1,4:3,6-dianhydrohexitol and alicyclic diol in ratio from 0.32 to 0.75; and thermoplastic fibers comprising a semi-crystalline polyester containing 1,4: 3,6-dianhydrohexitol units, an alicyclic diol and terephthalic acid, wherein diol component comprises 1,4:3,6-dianhydrohexitol and alicyclic diol in ratio from 0.05 to 0.30 are disclosed. Methods for producing the polymer composite are also disclosed.

11 Claims, No Drawings

THERMOPLASTIC COMPOSITE

CROSS-REFERENCE TO RELATED APPLICATIONS

This application is a National Stage Application of PCT/EP2018/061723 filed May 7, 2018, which claims priority from French Patent Application No. 17 54004, filed on May 5, 2017. The priority of said PCT and French Patent Application are claimed. Each of the prior mentioned applications is hereby incorporated by reference herein in its entirety.

FIELD OF THE INVENTION

The invention relates to the field of materials and relates to a thermoplastic composite and the process for manufacturing same, said composite being particularly suitable for recycling.

TECHNOLOGICAL BACKGROUND

Because of their mechanical properties, plastic materials and especially thermoplastic polymers are widely used in industry for the manufacture of a multitude of products. Thus, manufacturers are constantly looking for novel processes making it possible to improve the properties of existing polymers, or novel polymers having improved properties.

To this end, in order to increase the mechanical strength of polymers, it is known to incorporate various compounds therein in order to obtain composite materials having improved mechanical properties. These various compounds act as reinforcement, substantially improving the mechanical behavior of the polymers within which they are incorporated. These reinforcements are generally fibers, such as natural fibers, synthetic fibers, carbon fibers or even glass fibers.

In recent years, the market for composite materials has demonstrated continual growth. Thus, many sectors of activity, such as medical, sports, automotive, or else green energy, are integrating these materials in the design of their products.

Composite materials constitute new sources of innovation and offer new growth opportunities for the industry. They are defined as materials consisting of a reinforcement and a matrix, and are distinguished from other synthetic plastic products by characteristics that enable them, with properties of unalterability and low weight, to be able to replace metal parts in some cases.

However, like any material, more so when said materials are produced on a large scale, the question of recycling is inexorably posed.

The heterogeneity associated with the very nature of composite materials gives them a major benefit through the combined properties of the matrix and the fibers, but it is also the parameter that makes them difficult to recycle. In addition, the composite materials are anisotropic, that is to say that the properties are not the same in all directions, and they may contain foams, inserts or even in some cases sensors. Thus, there is such a diversity of material to treat, that their recycling is complicated and expensive.

For several years, efforts have focused on composite materials consisting of a thermosetting matrix. Indeed, these "thermoset" composites represent more than 95% of the composites used in industry. Alternatively, "thermoplastic" composites are starting to be developed and have the not insignificant advantage of having a matrix that can be melted and reformed again, which is impossible for thermoset materials, thereby facilitating the possibilities of recycling.

Despite this, when it is a question of dissociating the fiber from the matrix with a view to recycling these materials, the issues remain the same for both families of composites. The most sophisticated techniques, in which the matrix is decomposed without degradation of the fiber, are still for the most part at the experimental stage. These are for example techniques such as solvolysis, pyrolysis or thermolysis that involve chemistry, heat or thermodynamics to recover a reusable fiber.

At present, there are multiple technical options for recycling composites. Thus, recycling can be achieved by chemical methods, thermal methods (aside from incineration), mechanical methods, by incineration, or as a last resort, by disposal.

Mechanical techniques may consist in grinding the composite parts at the end of their life and thus make it possible to recover material in the form of powder. In some cases, this material is returned to the field of plastics processing to use it to make technical parts, but in general these powders are used to produce volume at low cost in concrete for example, in competition in particular with sand or talc.

Incineration is also proving to be an alternative that is developing well. In this particular case, it is not a question of recycling per se, but rather of creating value, since by burning the ground composite materials, it is thus possible to recover the heat energy from the matrix, itself derived from oil. Cement plants, with furnaces which can heat up to 2000° C., are the ideal consumers thereof.

Nevertheless, the fact remains that in order to create value from 90% of the composite material waste which is currently being sent to landfill, there is a need to find alternatives and to develop novel composites that are easily recyclable.

It is therefore to the applicant's credit to have developed, after significant research, an entirely thermoplastic composite having an ease of recycling that has hitherto never been achieved, said composite being able to be entirely recycled without it being necessary to separate the fibers from the matrix.

SUMMARY OF THE INVENTION

A first subject of the invention thus relates to a thermoplastic composite comprising:
- a thermoplastic polymer matrix, said matrix comprising an amorphous thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] ratio is at least 0.32 and at most 0.75, said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g/l of polyester) of which is greater than 50 ml/g,
- thermoplastic polymer fibers, said fibers comprising a semicrystalline thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] ratio is at least 0.05 and at most 0.30, said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g/l of polyester) of which is greater than 50 ml/g.

A second subject relates to a process for producing a thermoplastic composite, said process comprising the following steps of:
a) providing a polymer matrix as described previously,
b) providing polymer fibers as described previously,
c) preparing a thermoplastic composite from said matrix and said fibers.

The thermoplastic composite according to the invention is entirely thermoplastic, both the matrix and the fiber reinforcement, and in particular has the advantage of obtaining ease of recycling hitherto never achieved.

Indeed, the entirely thermoplastic character of the composite according to the invention makes it possible in particular to dispense with the separation step usually carried out. Thus, recycling is more efficient, less expensive, and makes it possible to obtain no longer a composite but a uniform thermoplastic material which can be used for a multitude of plastic applications. In terms of recycling and creating value from the materials, and especially thermoplastic materials, the thermoplastic composite according to the invention is therefore a technological breakthrough.

DETAILED DESCRIPTION

A first subject of the invention therefore relates to a thermoplastic composite comprising:
a thermoplastic polymer matrix, said matrix comprising an amorphous thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] molar ratio is at least 0.32 and at most 0.75, said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g/l of polyester) of which is greater than 50 ml/g,
thermoplastic polymer fibers, said fibers comprising a semicrystalline thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] molar ratio is at least 0.05 and at most 0.30, said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g/l of polyester) of which is greater than 50 ml/g.

The thermoplastic composite according to the invention thus comprises a thermoplastic matrix comprising an amorphous thermoplastic polyester.

More particularly, this is a thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] molar ratio is at least 0.32 and at most 0.75, The thermoplastic polyester does not contain any aliphatic non-cyclic diol units, or comprises a small molar amount of aliphatic non-cyclic diol units.

"Small molar amount of aliphatic non-cyclic diol units" is intended to mean, especially, a molar amount of aliphatic non-cyclic diol units of less than 5%. According to the invention, this molar amount represents the ratio of the sum of the aliphatic non-cyclic diol units, these units possibly being identical or different, relative to all the monomer units of the polyester.

Advantageously, the molar amount of aliphatic non-cyclic diol unit is less than 1%. Preferably, the polyester does not contain any aliphatic non-cyclic diol units and more preferentially it does not contain any ethylene glycol.

An aliphatic non-cyclic diol may be a linear or branched aliphatic non-cyclic diol. It may also be a saturated or unsaturated aliphatic non-cyclic diol. Aside from ethylene glycol, the saturated linear aliphatic non-cyclic diol may for example be 1,3-propanediol, 1,4-butanediol, 1,5-pentanediol, 1,6-hexanediol, 1,8-octanediol and/or 1,10-decanediol. As examples of saturated branched aliphatic non-cyclic diol, mention may be made of 2-methyl-1,3-propanediol, 2,2,4-trimethyl-1,3-pentanediol, 2-ethyl-2-butyl-1,3-propanediol, propylene glycol and/or neopentyl glycol. As an example of an unsaturated aliphatic diol, mention may be made, for example, of cis-2-butene-1,4-diol.

Despite the low amount of aliphatic non-cyclic diol, and hence of ethylene glycol, used for the synthesis, a thermoplastic polyester is obtained which has a high reduced viscosity in solution and in which the isosorbide is particularly well incorporated.

The monomer (A) is a 1,4: 3,6-dianhydrohexitol and may be isosorbide, isomannide, isoidide, or a mixture thereof. Preferably, the 1,4: 3,6-dianhydrohexitol (A) is isosorbide.

Isosorbide, isomannide and isoidide may be obtained, respectively, by dehydration of sorbitol, of mannitol and of iditol. As regards isosorbide, it is sold by the applicant under the brand name Polysorb® P.

The alicyclic diol (B) is also referred to as aliphatic and cyclic diol. It is a diol which may especially be chosen from 1,4-cyclohexanedimethanol, 1,2-cyclohexanedimethanol, 1,3-cyclohexanedimethanol or a mixture of these diols. The alicyclic diol (B) is very preferentially 1,4-cyclohexanedimethanol. The alicyclic diol (B) may be in the cis configuration, in the trans configuration, or may be a mixture of diols in the cis and trans configurations.

The molar ratio of 1,4: 3,6-dianhydrohexitol units (A)/ sum of 1,4: 3,6-dianhydrohexitol units (A) and alicyclic diol units (B) other than the 1,4: 3,6-dianhydrohexitol units (A), i.e. (A)/[(A)+(B)], is at least 0.32 and at most 0.75. In this way, the thermoplastic polyester is amorphous and is characterized by an absence of X-ray diffraction lines and by an absence of an endothermic melting peak in differential scanning calorimetry (DSC) analysis.

An amorphous thermoplastic polyester that is particularly suitable for the thermoplastic composite comprises:
a molar amount of 1,4: 3,6-dianhydrohexitol units (A) ranging from 16 to 54%;
a molar amount of alicyclic diol units (B) other than the 1,4: 3,6-dianhydrohexitol units (A) ranging from 5 to 30%;
a molar amount of terephthalic acid units (C) ranging from 45 to 55%.

The amounts of different units in the polyester may be determined by $^1$H NMR or by chromatographic analysis of the mixture of monomers resulting from complete hydrolysis or methanolysis of the polyester; the amounts are preferably determined by $^1$H NMR.

Those skilled in the art can readily find the analysis conditions for determining the amounts of each of the units of the polyester. For example, from an NMR spectrum of a poly(1,4-cyclohexanedimethylene-co-isosorbide terephthalate), the chemical shifts relating to the 1,4-cyclohexanedimethanol are between 0.9 and 2.4 ppm and 4.0 and 4.5 ppm, the chemical shifts relating to the terephthalate ring are between 7.8 and 8.4 ppm and the chemical shifts relating to the isosorbide are between 4.1 and 5.8 ppm. The integration of each signal makes it possible to determine the amount of each unit of the polyester.

The amorphous thermoplastic polyesters used according to the invention have a glass transition temperature ranging from 116 to 200° C., for example from 140 to 190° C.

The glass transition temperature is measured by conventional methods and especially a differential scanning calorimetry (DSC) method using a heating rate of 10° C./min. The experimental protocol is described in detail in the examples section below.

The amorphous thermoplastic polyester especially has a lightness L* greater than 40. Lightness is understood in the sense of the Hunter color values, in which it is derived from the surface luminance of the object. Advantageously, the lightness L* is greater than 55, preferably greater than 60, most preferentially greater than 65, for example greater than 70. The parameter L* may be determined using a spectrophotometer, via the CIE Lab model.

Finally, the reduced viscosity in solution is greater than 50 ml/g and less than 120 ml/g, this viscosity being able to be measured using an Ubbelohde capillary viscometer at 25° C. in an equi-mass mixture of phenol and ortho-dichlorobenzene after dissolving the polymer at 130° C. with stirring, the concentration of polymer introduced being 5 g/l.

The amorphous character of the thermoplastic polyesters used according to the present invention is characterized by the absence of X-ray diffraction lines and also by the absence of an endothermic fusion peak in differential scanning calorimetry (DSC) analysis.

According to a particular embodiment, the thermoplastic composite according to the invention comprises 20 to 70% by weight of amorphous thermoplastic polyester matrix as described previously, preferentially 30 to 60% by weight.

According to one embodiment, the thermoplastic matrix of the composite according to the invention essentially consists of amorphous thermoplastic polyester.

The thermoplastic composite according to the invention also comprises thermoplastic fibers comprising a semicrystalline thermoplastic polyester.

The term "fibers" as used in the present invention is synonymous with the term filaments and yarns, thus including continuous or discontinuous monofilaments or multifilaments, non-twisted or intermingled multifilaments, base yarns. In addition, the term "fibers" is also used regardless of the form in which the fibers are found, namely in woven or nonwoven form.

The semicrystalline thermoplastic polyester fibers act as reinforcement within the thermoplastic composite according to the invention.

More particularly, the semicrystalline thermoplastic polyester used to obtain the fibers is a thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] ratio is at least 0.05 and at most 0.30, said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g/l of polyester) of which is greater than 50 ml/g.

The monomer (A) and the alicyclic diol (B) are as described above for the amorphous thermoplastic polyester.

The molar ratio of 1,4: 3,6-dianhydrohexitol units (A)/ sum of 1,4: 3,6-dianhydrohexitol units (A) and alicyclic diol units (B) other than the 1,4: 3,6-dianhydrohexitol units (A), i.e. (A)/[(A)+(B)] is at least 0.05 and at most 0.30. Advantageously, this ratio is at least 0.1 and at most 0.28, and more particularly this ratio is at least 0.15 and at most 0.30.

A semicrystalline thermoplastic polyester that is particularly suitable for obtaining the fibers according to the invention comprises:
- a molar amount of 1,4: 3,6-dianhydrohexitol units (A) ranging from 2.5 to 15 mol %;
- a molar amount of alicyclic diol units (B) other than the 1,4: 3,6-dianhydrohexitol units (A) ranging from 30 to 42.5 mol %;
- a molar amount of terephthalic acid units (C) ranging from 45 to 55 mol %.

The fibers obtained with the semicrystalline thermoplastic polyesters described above advantageously have a melting point ranging from 210 to 295° C., for example from 240 to 285° C.

Furthermore, the semicrystalline thermoplastic polyesters have a glass transition temperature ranging from 85 to 120° C., for example from 90 to 115° C.

The glass transition temperatures and melting points are measured by conventional methods, especially using differential scanning calorimetry (DSC) using a heating rate of 10° C./min. The experimental protocol is also described in detail in the examples section below.

Advantageously, the semicrystalline thermoplastic polyester has a heat of fusion of greater than 10 J/g, preferably greater than 20 J/g, the measurement of this heat of fusion consisting in subjecting a sample of this polyester to a heat treatment at 170° C. for 16 hours, then in evaluating the heat of fusion by DSC by heating the sample at 10° C./min.

The semicrystalline thermoplastic polyester used according to the invention in particular has a lightness L* greater than 40. Advantageously, the lightness L* is greater than 55, preferably greater than 60, most preferentially greater than 65, for example greater than 70. The parameter L* may be determined using a spectrophotometer, via the CIE Lab model.

Finally, the reduced viscosity in solution of said semicrystalline thermoplastic polyester is greater than 50 ml/g and preferably less than 120 ml/g, this viscosity being able to be measured using an Ubbelohde capillary viscometer at 25° C. in an equi-mass mixture of phenol and ortho-dichlorobenzene after dissolving the polymer at 130° C. with stirring, the concentration of polymer introduced being 5 g/l.

As developed previously for the thermoplastic matrix, this test for measuring reduced viscosity in solution is, due to the choice of solvents and the concentration of the polymers used, perfectly suited to determining the viscosity of the semicrystalline thermoplastic polymer.

The semicrystalline nature of the thermoplastic polyesters used according to the present invention is distinguished when the latter, after a heat treatment of 16 h at 170° C., have X-ray diffraction lines or an endothermic melting peak in differential scanning calorimetry (DSC) analysis.

Starting from the semicrystalline thermoplastic polyester as defined previously, the fibers according to the invention may be obtained according to methods known to those skilled in the art, for instance the method of melt spinning or by processes in solution (also called wet or dry processes). Preferentially, the fibers are obtained by the melt-spinning method.

The fibers may be either woven fibers, nonwoven fibers, or a blend of woven and nonwoven fibers. A nonwoven may consist of a web, a cloth, a lap, or else a mattress of directionally or randomly distributed fibers, the internal cohesion of which is provided by mechanical, physical or chemical methods or else by a combination of these methods. An example of internal cohesion may be adhesive-bonding, and results in the obtaining of a nonwoven cloth, said nonwoven cloth possibly then being made into the form of a mat of fibers.

According to a particular embodiment, the fibers of the thermoplastic composite are woven fibers. The weaving of said fibers may be performed according to a taffeta, twill, satin or even unidirectional interweaving, and preferably according to a taffeta interweaving.

According to another embodiment, the fibers of the thermoplastic composite are nonwoven. The fiber nonwoven may be obtained according to the techniques known to those skilled in the art, such as the dry route, the melt route, the wet route or flash spinning. By way of example, the formation of nonwoven fibers by the dry route may in particular be carried out by calendering or by an airlaid process. With regard to the production by the melt route, it can be carried out by extrusion (spinbonding technology or spunbonded fabric) or by extrusion blow-molding (melt-blown).

The polyester fibers according to the invention have very good properties, both from the mechanical and thermal point of view, and constitute a reinforcement of choice that is particularly suitable for a thermoplastic composite. Indeed, the fibers according to the invention have for example an improvement in mechanical properties such as elongation at break or else persistence, compared to conventional polymer fibers.

In addition, the use of the fibers according to the invention for the manufacture of a thermoplastic composite is particularly advantageous in that it also makes it possible to avoid the phenomenon of putrefaction that can sometimes occur with certain natural fibers.

According to one embodiment, the thermoplastic composite comprises from 30 to 80% by weight of semicrystalline thermoplastic polyester fibers as described previously, preferentially from 40 to 70% by weight.

According to one embodiment, the thermoplastic fibers of the composite according to the invention consist essentially of semicrystalline thermoplastic polyester.

According to one embodiment, the thermoplastic composite consists essentially of a thermoplastic matrix as defined previously and thermoplastic fibers as defined previously.

The thermoplastic composite according to the invention is particularly advantageous. Unlike the current composite materials, the thermoplastic composite according to the invention is entirely thermoplastic, both the matrix and the fiber reinforcement, with the direct consequence of obtaining ease of recycling hitherto never achieved. The inventors have thus found, in an entirely original way, that the chemical similarity of the matrix and the fibers according to the invention made it possible to obtain, during heating to a temperature greater than the melting point (Mp) of the fibers, transesterification reactions between said matrix and said fibers, thus leading to a thermoplastic material comprising compatible phases or even entirely homogeneous phases depending on the recycling conditions used.

Hitherto, for recycling, even though their matrices may be melted, thermoplastic composites had the same difficulties in terms of separation of fibers/matrix as thermoductile composites. Now, since the composite according to the invention is entirely thermoplastic, the separation step conventionally carried out is dispensed with. Thus, recycling is more efficient, less expensive, and makes it possible to obtain no longer a composite but a uniform thermoplastic material which can be used for a multitude of plastic applications. In terms of recycling and creating value from the materials, and especially thermoplastic materials, the thermoplastic composite according to the invention is therefore a technological breakthrough. It is understood that the composite according to the invention has at least the same mechanical properties as a thermoplastic composite composed of the reinforcements conventionally used hitherto.

The amorphous thermoplastic polyester that is particularly suitable for obtaining the thermoplastic matrix can be prepared by a synthesis process comprising:

a step of introducing, into a reactor, monomers comprising at least one 1,4: 3,6-dianhydrohexitol (A), at least one alicyclic diol (B) other than the 1,4: 3,6-dianhydrohexitols (A) and at least one terephthalic acid (C), the molar ratio (A)/[(A)+(B)] being at least 0.32 and at most 0.75 and the ratio ((A)+(B))/(C) ranging from 1.05 to 1.5, said monomers not containing any aliphatic non-cyclic diols or comprising, relative to all of the monomers introduced, a molar amount of aliphatic non-cyclic diol units of less than 5%;

a step of introducing a catalytic system into the reactor;

a step of polymerizing said monomers to form the polyester, said step consisting of:

a first stage of oligomerization, during which the reaction medium is stirred under an inert atmosphere at a temperature ranging from 265 to 280° C., advantageously from 270 to 280° C., for example 275° C.;

a second stage of condensation of the oligomers, during which the oligomers formed are stirred under vacuum, at a temperature ranging from 278 to 300° C. so as to form the polyester, advantageously from 280 to 290° C., for example 285° C.;

a step of recovering the thermoplastic polyester.

This first stage of the process is carried out in an inert atmosphere, that is to say under an atmosphere of at least one inert gas. This inert gas may especially be dinitrogen. This first stage may be carried out under a gas stream and it may also be carried out under pressure, for example at a pressure of between 1.05 and 8 bar.

Preferably, the pressure ranges from 3 to 8 bar, most preferentially from 5 to 7.5 bar, for example 6.6 bar. Under these preferred pressure conditions, the reaction of all the monomers with one another is promoted by limiting the loss of monomers during this stage.

Prior to the first stage of oligomerization, a step of deoxygenation of the monomers is preferentially carried out. It can be carried out for example once the monomers have been introduced into the reactor, by creating a vacuum then by introducing an inert gas such as nitrogen thereto. This vacuum-inert gas introduction cycle can be repeated several times, for example from 3 to 5 times. Preferably, this vacuum-nitrogen cycle is carried out at a temperature of between 60 and 80° C. so that the reagents, and especially the diols, are totally molten. This deoxygenation step has the advantage of improving the coloration properties of the polyester obtained at the end of the process.

The second stage of condensation of the oligomers is carried out under vacuum. The pressure may decrease continuously during this second stage by using pressure decrease gradients, in steps, or else using a combination of pressure decrease gradients and steps. Preferably, at the end of this second stage, the pressure is less than 10 mbar, most preferentially less than 1 mbar.

The first stage of the polymerization step preferably has a duration ranging from 20 minutes to 5 hours. Advantageously, the second stage has a duration ranging from 30 minutes to 6 hours, the beginning of this stage consisting in the moment at which the reactor is placed under vacuum, that is to say at a pressure of less than 1 bar.

The process also comprises a step of introducing a catalytic system into the reactor. This step may take place beforehand or during the polymerization step described above.

Catalytic system is intended to mean a catalyst or a mixture of catalysts, optionally dispersed or fixed on an inert support.

The catalyst is used in amounts suitable for obtaining a high-viscosity polymer for the obtaining of the polymer composition.

An esterification catalyst is advantageously used during the oligomerization stage. This esterification catalyst can be chosen from derivatives of tin, titanium, zirconium, hafnium, zinc, manganese, calcium and strontium, organic catalysts such as para-toluenesulfonic acid (PTSA) or methanesulfonic acid (MSA), or a mixture of these catalysts. By way of example of such compounds, mention may be made of those given in application US 2011282020A1 in paragraphs [0026] to [0029], and on page 5 of application WO 2013/062408 A1.

Preferably, a zinc derivative or a manganese, tin or germanium derivative is used during the first stage of transesterification.

By way of example of amounts by weight, use may be made of from 10 to 500 ppm of metal contained in the catalytic system during the oligomerization stage, relative to the amount of monomers introduced.

At the end of transesterification, the catalyst from the first step can be optionally blocked by adding phosphorous acid or phosphoric acid, or else, as in the case of tin(IV), reduced with phosphites such as triphenyl phosphite or tris(nonylphenyl) phosphites or those cited in paragraph [0034] of application US 2011282020A1.

The second stage of condensation of the oligomers may optionally be carried out with the addition of a catalyst. This catalyst is advantageously chosen from tin derivatives, preferentially derivatives of tin, titanium, zirconium, germanium, antimony, bismuth, hafnium, magnesium, cerium, zinc, cobalt, iron, manganese, calcium, strontium, sodium, potassium, aluminum or lithium, or of a mixture of these catalysts. Examples of such compounds may for example be those given in patent EP 1 882 712 B1 in paragraphs [0090] to [0094].

Preferably, the catalyst is a tin, titanium, germanium, aluminum or antimony derivative.

By way of example of amounts by weight, use may be made of from 10 to 500 ppm of metal contained in the catalytic system during the stage of condensation of the oligomers, relative to the amount of monomers introduced.

Most preferentially, a catalytic system is used during the first stage and the second stage of polymerization. Said system advantageously consists of a catalyst based on tin or of a mixture of catalysts based on tin, titanium, germanium and aluminum.

By way of example, use may be made of an amount by weight of 10 to 500 ppm of metal contained in the catalytic system, relative to the amount of monomers introduced.

According to the preparation process, an antioxidant is advantageously used during the step of polymerization of the monomers. These antioxidants make it possible to reduce the coloration of the polyester obtained. The antioxidants may be primary and/or secondary antioxidants. The primary antioxidant may be a sterically hindered phenol, such as the compounds Hostanox® 0 3, Hostanox® 0 10, Hostanox® 0 16, Ultranox® 210, Ultranox® 276, Dovernox® 10, Dovernox® 76, Dovernox® 3114, Irganox® 1010 or Irganox® 1076 or a phosphonate such as Irgamod® 195. The secondary antioxidant may be trivalent phosphorus compounds such as Ultranox® 626, Doverphos® S-9228, Hostanox® P-EPQ or Irgafos 168.

It is also possible to introduce as polymerization additive into the reactor at least one compound that is capable of limiting unwanted etherification reactions, such as sodium acetate, tetramethylammonium hydroxide or tetraethylammonium hydroxide.

Finally, the process comprises a step of recovering the polyester at the end of the polymerization step. The thermoplastic polyester thus recovered can then serve as a thermoplastic matrix in the process described according to the invention.

A semicrystalline polyester which is particularly suitable for obtaining the thermoplastic fibers may be prepared by a synthesis process as described previously but with, as a variant, a molar ratio (A)/[(A)+(B)] of at least 0.05 and at most 0.30, said process also comprising a step of increasing the molar mass.

The step of increasing the molar mass is carried out by post-polymerization and may consist of a step of solid-state polycondensation (SSP) of the semicrystalline thermoplastic polyester or of a step of reactive extrusion of the semicrystalline thermoplastic polyester in the presence of at least one chain extender.

Thus, according to a first variant, the post-polymerization step is carried out by SSP.

SSP is generally carried out at a temperature between the glass transition temperature and the melting point of the polymer. Thus, in order to carry out the SSP, it is necessary for the polymer to be semicrystalline. Preferably, the latter has a heat of fusion of greater than 10 J/g, preferably greater than 20 J/g, the measurement of this heat of fusion consisting in subjecting a sample of this polymer of lower reduced viscosity in solution to a heat treatment at 170° C. for 16 hours, then in evaluating the heat of fusion by DSC by heating the sample at 10 K/min.

Advantageously, the SSP step is carried out at a temperature ranging from 190 to 280° C., preferably ranging from 200 to 250° C., this step imperatively having to be carried out at a temperature below the melting point of the semicrystalline thermoplastic polyester.

The SSP step may be carried out in an inert atmosphere, for example under nitrogen or under argon or under vacuum.

According to a second variant, the post-polymerization step is carried out by reactive extrusion of the semicrystalline thermoplastic polyester in the presence of at least one chain extender.

The chain extender is a compound comprising two functions capable of reacting, in reactive extrusion, with alcohol, carboxylic acid and/or carboxylic acid ester functions of the semicrystalline thermoplastic polyester. The chain extender may, for example, be chosen from compounds comprising two isocyanate, isocyanurate, lactam, lactone, carbonate, epoxy, oxazoline and imide functions, it being possible for said functions to be identical or different. The chain extension of the thermoplastic polyester may be carried out in all of the reactors capable of mixing a very viscous medium with stirring that is sufficiently dispersive to ensure a good interface between the molten material and the gaseous headspace of the reactor. A reactor that is particularly suitable for this treatment step is extrusion.

The reactive extrusion may be carried out in an extruder of any type, especially a single-screw extruder, a co-rotating twin-screw extruder or a counter-rotating twin-screw extruder. However, it is preferred to carry out this reactive extrusion using a co-rotating extruder.

The reactive extrusion step may be carried out by:
  introducing the polymer into the extruder so as to melt said polymer;
  then introducing the chain extender into the molten polymer;
  then reacting the polymer with the chain extender in the extruder;
  then recovering the semicrystalline thermoplastic polyester obtained in the extrusion step.

During the extrusion, the temperature inside the extruder is adjusted so as to be above the melting point of the polymer. The temperature inside the extruder may range from 150 to 320° C.

The semicrystalline thermoplastic polyester obtained after the step of increasing the molar mass is recovered and can then serve for obtaining the thermoplastic fibers according to the invention.

A second subject of the invention relates to a process for producing a thermoplastic composite, said process comprising the following steps of:
  a) providing a thermoplastic polymer matrix as described previously,
  b) providing thermoplastic polymer fibers as described previously,
  c) preparing a thermoplastic composite from said matrix and said fibers.

According to one embodiment, the polymer matrix is provided in such a way that the thermoplastic composite comprises from 30 to 80% by weight of semicrystalline thermoplastic polyester fibers as described previously, preferentially from 40 to 70% by weight.

Step c) of the process according to the invention consists in preparing a thermoplastic composite from said matrix and said fibers described previously.

This preparation step may be carried out by mixing or incorporating the fibers into the polyester matrix followed by a step of forming. For the purposes of the present invention, the terms "impregnation" and "wetting" are synonymous. Incorporation may consist in impregnating the semicrystalline thermoplastic polyester fibers with the amorphous thermoplastic polyester matrix. The incorporation according to the process of the invention may be carried out via techniques known to those skilled in the art, for instance impregnation by a melt. After the impregnation, a step of forming may be carried out, said forming possibly also being carried out according to the techniques of those skilled in the art, for instance by compression/stamping, by pultrusion, by low pressure under vacuum or else by filament winding.

According to one embodiment, the incorporation is carried out by impregnation by a melt and the forming is carried out by hot compression. According to this embodiment, the semicrystalline thermoplastic polyester fibers may be in the form of a taffeta weave which can be cut and placed between two sheets of amorphous matrix. The assembly is then placed in a press, heated above the Tg of the matrix and pressed in order to obtain a plate, the fibers of which are impregnated by the matrix.

The assembly is then reheated and placed in a cold mold. After pressing and cooling, the assembly obtained constitutes the thermoplastic composite, the semicrystalline thermoplastic polyester fibers are perfectly incorporated into the amorphous thermoplastic polyester matrix and said composite is particularly strong.

The process according to the invention is therefore particularly advantageous because it makes it possible to obtain an entirely thermoplastic composite, both the matrix and the fiber reinforcement, thereby resulting in obtaining ease of recycling hitherto never achieved.

The thermoplastic composite according to the invention is thus most particularly applicable in the manufacture of plastic articles or objects and can thus be of use in many sectors of activity, such as automotive, aeronautics, naval, building or sport. Indeed, they may for example be used to manufacture automobile fitting parts such as door interiors, boat hulls or else to manufacture building materials.

The thermoplastic composites according to the invention will also be most particularly applicable in the manufacture of parts in sectors where the overall weight reduction of the structures is sought.

The invention will be understood more clearly by means of the examples below, which are intended to be purely illustrative and do not in any way limit the scope of the protection.

Examples

The properties of the polymers were studied via the following techniques:
Reduced Viscosity in Solution The reduced viscosity in solution is evaluated using an Ubbelohde capillary viscometer at 25° C. in an equi-mass mixture of phenol and ortho-dichlorobenzene after dissolving the polymer at 130° C. with stirring, the concentration of the polymer introduced being 5 g/l.
DSC The thermal properties of the polyesters were measured by differential scanning calorimetry (DSC): the sample is first heated under a nitrogen atmosphere in an open crucible from 10 to 320° C. (10° C.min$^{-1}$), cooled to 10° C. (10° C.min$^{-1}$), then heated again to 320° C. under the same conditions as the first step. The glass transition temperatures were taken at the mid-point of the second heating. Any melting points are determined on the endothermic peak (peak onset) at the first heating.

Similarly, the enthalpy of fusion (area under the curve) is determined at the first heating.

For the illustrative examples presented below, the following reagents were used:
1,4-Cyclohexanedimethanol (99% purity, mixture of cis and trans isomers)
Isosorbide (purity >99.5%) Polysorb® P from Roquette Frères
Terephthalic acid (99+% purity) from Acros
Irganox® 1010 from BASF AG
Dibutyltin oxide (98% purity) from Sigma Aldrich
Preparation of a Thermoplastic Composite
  A. Preparation of thermoplastic fibers
    1) Polymerization The thermoplastic polyester P1 is a semicrystalline thermoplastic polyester prepared according to the procedure below, with a molar ratio of 1,4: 3,6-dianhydrohexitol unit (A)/sum of the diol monomers, i.e. (A) to which must be added the alicyclic diol units (B) other than the 1,4: 3,6-dianhydrohexitol units (A), i.e. (A)/[(A)+(B)], of at least 0.05 and at most 0.30.

Thus, 1432 g (9.9 mol) of 1,4-cyclohexanedimethanol, 484 g (3.3 mol) of isosorbide, 2000 g (12.0 mol) of terephthalic acid, 1.65 g of Irganox 1010 (antioxidant) and 1.39 g of dibutyltin oxide (catalyst) are added to a 7.5 l reactor. 4 vacuum-nitrogen cycles are carried out once the temperature of the reaction medium is at 60° C.

The reaction mixture is then heated to 240° C. (4° C./min) under 6.6 bar of pressure and with constant stirring (150 rpm) until a degree of esterification of 40% is obtained. The degree of esterification is estimated from the mass of distillate collected. Once this degree is reached, the temperature of the reaction mixture is brought to 250° C. until a degree of esterification of 55% is obtained. Once this degree is reached, the reactor pressure is decreased to atmospheric pressure and the temperature is brought to 260° C. until a degree of esterification of 80% is obtained. The pressure is then reduced to 0.7 mbar over the course of 120 minutes according to a logarithmic gradient and the temperature is brought to 280° C.

These vacuum and temperature conditions are maintained until an increase in torque of 12.1 Nm relative to the initial torque is obtained.

Finally, a polymer rod is cast via the bottom valve of the reactor, cooled in a heat-regulated water bath at 15° C. and chopped up in the form of granules of about 15 mg.

The resin thus obtained has a reduced viscosity in solution of 80.1 ml/g$^{-1}$.

The $^1$H NMR analysis of the polyester shows that the final polyester contains 17.0 mol % of isosorbide relative to the diols.

With regard to the thermal properties, the polymer has a glass transition temperature of 96° C., a melting point of 253° C. with an enthalpy of fusion of 23.2 J/g.

A solid-state post-condensation step was carried out on 10 kg of these granules for 20 h at 210° C. under a stream of nitrogen (1500 l/h) in order to increase the molar mass. The resin after solid-state condensation has a reduced viscosity in solution of 103.4 ml·g$^{-1}$.

The polyester granules thus obtained can then be formed so as to obtain the thermoplastic fibers.

2) Forming

The granules of polyester P1 obtained in the polymerization step 1) are dried at 140° C. under nitrogen in order to reach a residual moisture content of the granules of less than 300 ppm and in particular 105 ppm.

The granules are then introduced into an extruder with 5 heating zones: 300° C. for the granule introduction zone, 295° C. in zone 2, 290° C. in zone 3, 285° C. in zone 4, 280° C. in zone 5 and 278° C. in the tube, in the material drive pump and in the filter for removing the gels, and the spinning head (in the direction of circulation of the stream of molten material).

The head used for this example makes it possible to form monofilaments and multifilaments. According to this example, the die head comprises 10 holes at a flow rate adjusted so as to have a flow rate of material per hole of 1.5 g/minute with a capillary diameter of 0.5 mm and a drive speed of 2000 m/minute.

At the outlet of the spinning head, a current of air at 25° C. cools the various filaments which are assembled at the point of convergence, then wound by means of a winder.

These reels are subsequently installed on a loom in order to obtain a taffeta type weave. Woven thermoplastic fibers of taffeta type are thus obtained.

B. Preparation of the Thermoplastic Matrix

1. Polymerization

In order to obtain the thermoplastic matrix, a second thermoplastic polyester P2 was prepared according to the same procedure as the polyester P1. This second polyester P2 is an amorphous thermoplastic polyester. The amounts of the compounds used are given in detail in table 1 below:

TABLE 1

| COMPOUNDS | P2 |
| --- | --- |
| 1,4-cyclohexanedimethanol | 859 g (6 mol) |
| Isosorbide | 871 g (6 mol) |
| Terephthalic acid | 1800 g (10.8 mol) |
| Irganox 1010 (antioxidant) | 1.5 g |
| Dibutyltin oxide (catalyst) | 1.23 g |

The resin thus obtained with the polyester P2 has a reduced viscosity in solution of 54.9 ml/g$^{-1}$.

The $^1$H NMR analysis of the polyester shows that the final polyester contains 44 mol % of isosorbide relative to the diols. With regard to the thermal properties, the polymer has a glass transition temperature of 125° C.

After analysis, the polyester P2 is not characterized by the presence of X-ray diffraction lines and also by the presence of an endothermic melting peak in differential scanning calorimetry (DSC) analysis, even after a heat treatment for 16 h at 170° C. The polyester P2 is therefore amorphous.

2. Forming

The P2 granules are dried at 110° C. under vacuum for 4 h. The moisture content before cast extrusion is 287 ppm. Cast extrusion is carried out using a Collin extruder fitted with a flat die.

These granules are kept in a dry atmosphere and conveyed directly to the hopper of the extruder. The following temperatures are used for the extrusion of the polymer P2 on the woven thermoplastic fibers: 230° C./225° C./225° C./220° C. (4 heating zones, die-> feed). The rotational speed of the screw is 80 rpm and the temperature of the rollers of the calendering machine is 50° C.

The sheets obtained have a thickness of 500 μm.

C. Forming the Thermoplastic Composite

The preparation is carried out by pressing, said pressing being carried out on a Carver press.

Squares of thermoplastic fibers woven according to the taffeta weave are fixed between two extruded sheets, themselves arranged between the plates of the press (type of parts: plates).

The temperature of the plates is set at 160° C. and a pressure is applied on the material in order to obtain good impregnation of the thermoplastic fibers by the thermoplastic matrix. The weight of woven thermoplastic fibers is 50% by weight of the total weight of taffeta-woven thermoplastic fibers and molten material. After 2 minutes of contact, the temperature of the plates is lowered to 50° C.

Thus, a thermoplastic composite is obtained in the form of a plate within which the impregnation is perfectly achieved despite the thermoplastic nature of the fibers and the matrix. This is explained in particular due to the semicrystalline appearance of the thermoplastic fibers and their higher melting point than that of the amorphous thermoplastic matrix. The plates thus obtained can also be reheated and thermoformed in the form of tubs for example.

Bars are cut from the plates thus obtained and the mechanical properties are measured. An improvement in the mechanical properties with respect to the matrix alone is observed, in particular as regards the tensile properties.

Recycling the Thermoplastic Composite

The composite parts obtained are ground, dried at 110° C. under vacuum for 4 h (moisture content of 320 ppm), mixed with 100 ppm of dibutyltin oxide, then extruded with a uniform temperature of 280° C. before cooling in cold water bath and granulation.

A differential scanning calorimetry analysis of the granules thus obtained shows a decrease in the melting peak to 253° C. and the appearance of a glass transition around 110° C. These observations thus testify to the occurrence of transesterification reactions within the material during heating to a temperature greater than the melting point of the thermoplastic fibers. Thus, during recycling at said temperature, a material comprising compatible phases, or even completely homogeneous phases, is obtained.

The thermoplastic composite according to the invention is therefore particularly advantageous in that it is no longer necessary for the recycling thereof to separate the fibers from the matrix. A step of heating to a temperature greater than the temperature of the thermoplastic fibers simply makes it possible to obtain a thermoplastic material which can then be reused for a multitude of applications.

The invention claimed is:

1. A thermoplastic composite, comprising:
 a thermoplastic polymer matrix, said matrix comprising an amorphous thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] molar ratio is at least 0.32 and at most 0.75, said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g/l of polyester) of which is greater than 50 ml/g and,
 thermoplastic polymer fibers, said fibers comprising a semicrystalline thermoplastic polyester comprising at least one 1,4: 3,6-dianhydrohexitol unit (A), at least one alicyclic diol unit (B) other than the 1,4: 3,6-dianhydrohexitol units (A), at least one terephthalic acid unit (C), wherein the (A)/[(A)+(B)] molar ratio is at least 0.05 and at most 0.30, said polyester not containing any aliphatic non-cyclic diol units or comprising a molar amount of aliphatic non-cyclic diol units, relative to all the monomer units of the polyester, of less than 5%, and the reduced viscosity in solution (25° C.; phenol (50% m): ortho-dichlorobenzene (50% m); 5 g/l of polyester) of which is greater than 50 ml/g.

2. The thermoplastic composite as claimed in claim 1, wherein the alicyclic diol (B) is a diol chosen from 1,4-cyclohexanedimethanol, 1,2-cyclohexanedimethanol, or 1,3-cyclohexanedimethanol or a mixture of these diols.

3. The thermoplastic composite as claimed in claim 1, wherein the amorphous and semicrystalline thermoplastic polyesters do not contain any aliphatic non-cyclic diol units, or comprises a molar amount of aliphatic non-cyclic diol units, relative to all the monomer units of the polyester, of less than 1%.

4. The thermoplastic composite as claimed in claim 1, wherein the (3,6-dianhydrohexitol unit (A)+alicyclic diol unit (B) other than the 1,4: 3,6-dianhydrohexitol units (A))/(terephthalic acid unit (C)) molar ratio is from 1.05 to 1.5.

5. The thermoplastic composite as claimed in claim 1, wherein the 1,4: 3,6-dianhydrohexitol (A) is isosorbide.

6. The thermoplastic composite as claimed in claim 1, comprising 20 to 70% by weight of amorphous thermoplastic polyester matrix.

7. The thermoplastic composite as claimed in claim 1, comprising 30 to 80% by weight of semicrystalline thermoplastic polyester fibers.

8. The thermoplastic composite as claimed in claim 2, wherein the diol chosen is 1,4-cyclohexanedimethanol.

9. The thermoplastic composite as claimed in claim 3, wherein the polyester does not contain any aliphatic non-cyclic diol units.

10. The thermoplastic composite as claimed in claim 6, comprising 30 to 60% by weight of amorphous thermoplastic polyester matrix.

11. The thermoplastic composite as claimed in claim 7, comprising 40 to 70% by weight of semicrystalline thermoplastic polyester fibers.

* * * * *